US012709406B1

(12) United States Patent
Lowhorn et al.

(10) Patent No.: US 12,709,406 B1
(45) Date of Patent: Aug. 18, 2026

(54) AIRCRAFT INTEGRATED CABIN SENTIENCE NEURAL NETWORK

(71) Applicant: Gulfstream Aerospace Corporation, Savannah, GA (US)

(72) Inventors: Evan Lowhorn, Savannah, GA (US); Kristin Medin, Savannah, GA (US); Matthew Wallace, Savannah, GA (US); Zachary Grether, Savannah, GA (US)

(73) Assignee: GULFSTREAM AEROSPACE CORPORATION, Savannah, GA (US)

(*) Notice: Subject to any disclaimer, the term of this patent is extended or adjusted under 35 U.S.C. 154(b) by 0 days.

(21) Appl. No.: 19/077,306

(22) Filed: Mar. 12, 2025

(51) Int. Cl.

*B64D 45/00* (2006.01)
*B64D 11/00* (2006.01)
*B64D 13/06* (2006.01)
*G06Q 10/0633* (2023.01)

(52) U.S. Cl.

CPC .............. *B64D 45/00* (2013.01); *B64D 11/00* (2013.01); *B64D 13/06* (2013.01); *G06Q 10/0633* (2013.01); *B64D 2013/0603* (2013.01); *B64D 2045/007* (2013.01)

(58) Field of Classification Search

CPC ........ B64D 45/00; B64D 11/00; B64D 13/06; B64D 2013/0603; B64D 2045/007; G06Q 10/0633

USPC ........................................ 701/36, 45, 48, 49

See application file for complete search history.

(56) References Cited

U.S. PATENT DOCUMENTS

2021/0223840 A1* 7/2021 Medin ................ B64D 11/0624
2022/0258864 A1* 8/2022 Tatum .................... H05B 47/13
2023/0088236 A1* 3/2023 Medin ................. H04N 21/431 725/76

* cited by examiner

*Primary Examiner* — Hai H Huynh
(74) *Attorney, Agent, or Firm* — Ingrassia Fisher & Lorenz, LLP

(57) ABSTRACT

A method that optimizes assistance of an occupant in an area. The method can include receiving from a sensor communicatively coupled to a computing device, data relating to a behavior of an occupant positioned in an area. The method can also include processing the data in a sequence with the computing device. The method can also include classifying the sequence of data into time windows with the computing device. In addition, the method can include performing predictions with the computing device based on the classification of the sequence of data into the time windows. The method can also include identifying, with the computing device, a requirement of the occupant in the area based on the predictions. The method can also include outputting, with the computing device, a recommendation to optimize a workload to meet the requirement of the occupant in the area.

20 Claims, 6 Drawing Sheets

AIRCRAFT INTEGRATED CABIN SENTIENCE NEURAL NETWORK

TECHNICAL FIELD

The present invention relates to sensing behaviors of occupants in a vehicle and using artificial intelligence (AI)/machine-learning (ML) to analyze the sensed data to identify requirements of the occupants and provide recommendations to optimize workloads of service members to meet the requirements of the occupants.

BACKGROUND

Currently, the highest form of cabin experience in a vehicle can be ensured by trained cabin attendants. The cabin attendants can attend to the needs of the passengers on board. However, the cabin attendants can also be charged with duties which range from mission coordination, stocking galleys and lavatories, safety briefing, food preparation, bed preparation, service, cleaning and emergency response within the vehicle.

Many of these duties of the cabin attendants can overlap in time and can be exhaustive in effort. Moreover, it is theorized that some aspects of support can be off boarded to a sentient cabin module which detects passengers' needs related to environmental control and assists the passenger in those areas of service.

A cabin application can also be optimized in the future where necessary steps by today's rules can be omitted to simplify the cabin operating application of the future as well. One such necessary step, the seat selection of where the passenger is located in the cabin when the application is launched and "change seat" transaction when a passenger moves location, can be wholesale removed as the sentient cabin module understands the proximity of passenger devices to monuments around the cabin.

Nevertheless, the cabin attendants may not always be aware of the needs of passengers at various intervals. The cabin attendants may not always know when the passengers are facing a medical emergency, or when the settings in the vehicle need to be adjusted. The cabin attendants often may learn of these adjustments at a later interval that can be inconvenient to the passengers.

Accordingly, it is desirable to provide a system in which the needs of the occupants and passengers can be anticipated and provided for in a timely manner. Further, a need exits to optimize the workload of cabin attendants so that the cabin attendants know when to assist passengers and occupants, and when to perform tasks within their respective workload.

BRIEF SUMMARY

Various non-limiting embodiments of methods and apparatuses for optimizing assistance to occupants in a vehicle are disclosed herein. In a first non-limiting embodiment, a method for optimizing assistance can include, but is not limited to, receiving from a sensor communicatively coupled to a computing device, data relating to a behavior of the occupant positioned in an area. The method can also include, but is not limited to, processing the data into a sequence with the computing device. The method can also include, but is not limited to, classifying the sequence of data into time windows with the computing device. In addition, the method can include, but is not limited to, performing predictions with the computing device based on the classification of the sequence of data into the time windows. The method can also include, but is not limited to, identifying, with the computing device, a requirement of the occupant in the area based on the predictions. The method can also include, but is not limited to, outputting, with the computing device, a recommendation to optimize a workload to meet the requirement of the occupant in the area.

In another non-limiting embodiment, a non-transitory machine-readable storage medium that provides instructions that, when executed by a processor, are configurable to cause the processor to perform operations that include, but are not limited to, receiving from a sensor communicatively coupled to the processor, data relating to a behavior of an occupant positioned in an area. The processor's operations can also include, but are not limited to, processing the data into a sequence. In addition, the processor's operations can include, but are not limited to, classifying the sequence of data into time windows. The processor's operations can also include, but are not limited to, performing predictions based on the classification of the sequence of data into the time windows. The processor's operations can also include, but are not limited to, identifying a requirement of the occupant in the area based on the predictions. In addition, the processor's operations can also include, but are not limited to, outputting a recommendation to optimize a workload to meet the requirement of the occupant in the area.

In yet another non-limiting embodiment, a computing system can include a non-transitory machine-readable storage medium that stores software. The computing system can further include a processor coupled to the non-transitory machine-readable storage medium, to execute the software the implements a large language model (LLM) grounding service that is configured to perform operations. The processor's operations can include, but are not limited to, receiving from a sensor communicatively coupled to the processor, data relating to a behavior of an occupant positioned in an area. The processor's operations can also include, but are not limited to, processing the data into a sequence. In addition, the processor's operations can also include, but are not limited to, classifying the sequence of data into time windows. The processor's operations can also include, but are not limited to, performing predictions based on the classification of the sequence of data into the time windows. The processor's operations can also include, but are not limited to, identifying a requirement of the occupant in the area based on the predictions. The processor's operations can also include, but are not limited to, outputting a recommendation to optimize a workload to meet the requirement of the occupant in the area.

BRIEF DESCRIPTION OF THE DRAWINGS

The present invention will hereinafter be described in conjunction with the following drawing figures, wherein like numerals denote like elements.

DETAILED DESCRIPTION

Figure 1A:
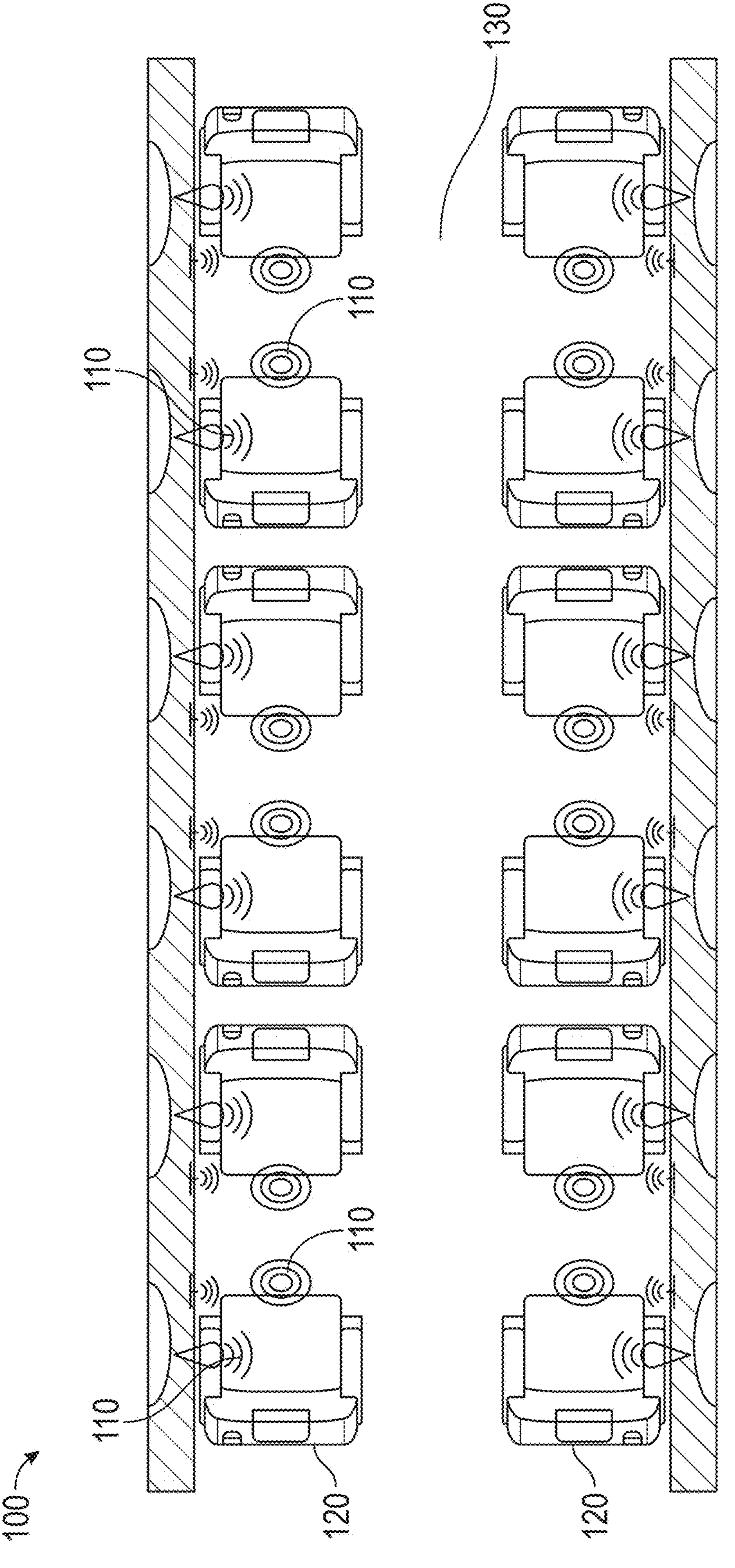
FIG. 1A is a plan view illustrating a non-limiting embodiment of a plurality of sensors positioned on and around seats in a cabin area in accordance with the teachings of the present disclosure.

The following detailed description is merely exemplary in nature and is not intended to limit the invention or the application and uses of the invention. Furthermore, there is no intention to be bound by any theory presented in the preceding background or the following detailed description.

An improved system to address the needs of occupants in a vehicle is disclosed herein. In an embodiment, sensors can be inconspicuously placed on and around seats within the vehicle. In an embodiment, the vehicle can be an aircraft. In other embodiments, other vehicles can be used. Passengers or occupants can be seated within the seats within the vehicle. The passengers can be unaware of the sensors within the cabin area. The sensors can be positioned within the cabin area to sense the motion and audio of the occupants during a the time period. The sensors can sense the audio and motion of the occupants. The sensors can sense when the occupants request assistance, request food and beverage service, and request help for medical emergencies.

The sensors can transmit this sensed data to a computing system communicatively coupled to the sensors. The computing system can be positioned remotely from the sensors and through a wired or wireless coupling, receive the sensed data from the sensors. In response, the computing system can process the data in a time series, wherein the data can be processed in the sequence in which the actions occurred. The computing system can then classify the time series data into time windows. With the time windows, computing system can place the continuous stream of data into specific time windows. After the classification of the time windows, the computing system can make sequence predictions based on the classification of the data into the time windows. The computing system can predict time intervals when the occupants may require assistance and when they may require privacy.

The computing system can then identify requirements of the occupants based on the sequence predictions. The requirements can include when the occupants may require food, beverage, or medical assistance. Other requirements can include adjusting cabin settings, such as lights, shades, and temperature in the cabin area to address comfort levels of each of the occupants. After the computing system identifies the requirements, the computing system can provide prompts and recommendations in continuous and multiple intervals to service members within the cabin. The computing system can provide the recommendations to alert the service members to address the requirements of the occupants in the cabin area.

As a result, the efficiency in which the cabin and service members address the requirements and needs of each of the occupants in the cabin area can be optimized. The service members can be more aware of when the occupants may require assistance in the cabin area. In addition, the efficiency of the workload of the service members can be optimized as well. The service members can be more aware of when they had to address the requirements of the occupants, and when they should perform their tasks within their respective workload.

Referring to FIG. 1A, in an embodiment, a system 100 is illustrated in which a plurality of sensors 110 are positioned on and around seats 120 in a cabin area 130 of a vehicle which can be aircraft. The sensors 110 can also be equipped with electro-optical (EO), infrared (IR), and piezoelectric properties. The vehicle is not limited to an aircraft. As such, the sensors 110, seats, 120, and cabin area 130 can be positioned in different types of vehicles in other embodiments. The purpose of the system 100 is to sense the behavior of the occupants in the cabin area 130 to identify the needs and requirements of the occupants during the time period. Upon identifying the needs and requirements of the occupants, a computing system communicatively coupled to the sensors 110 can provide recommendations to optimize the workload of service members in the cabin area to enable the service members to more efficiently meet their workload and also more efficiently assist the occupants with their requirements within the cabin area.

In FIG. 1A, a plan view of the system 100 is shown. The sensors 110 can be positioned inconspicuously within the cabin area 130. The sensors 110 can be positioned above, around, and on the seats 120 within the cabin area 130. The sensors 110 are not limited to any fixed position within the cabin area 130. The occupants within the cabin area 130 can be unaware of their presence. When the occupants are unaware of the presence of the sensors 110, the occupants can be more likely to exhibit their natural behavior. Accordingly, the computing system can become aware of their needs, requirements, and comfort levels after the sensors 110 transmit the sensed data to the computing system.

Referring again to FIG. 1A, when occupants are positioned in the seats 120, the sensors 110 can sense the motion and audio of the occupants within the cabin area 130. The motion can include the various body movements and position of the occupants. The motion and audio can include all of the various activities that the occupants may perform such as, but not limited to, reading, eating, and sleeping. The sensors 110 can sense the comfort levels and when the occupants request for assistance and any dialogue in which the occupants request cabin settings such as the lights and temperature in the cabin area 130 to be adjusted. The sensors 110 thereby sense the behavior of each of the occupants. The sensors 110 can transmit this sensed data to a computing system positioned away from the sensors 110, but communicatively coupled to the sensors 110. The computing system can process the received data from the sensors 110.

In FIG. 1A, the computing system can process the data as time series data, wherein the computing system processes the data in a sequence in which the actions represented by the data occurred. The computing system can then classify the time series data into time windows. With the time windows, computing system can segment the continuous stream of data into time windows. The time windows can indicate specific time segments in which particular behaviors of the occupants occur. Such behaviors can include when the occupant was reading, which can be in a different time window from when the occupants were eating and sleeping. There can be different time windows that correlate with when the occupants were performing certain activities. As such, the computing system can identify the time windows in which the occupants requested assistance.

In FIG. 1A, after the classification of the time windows, the computing system can then perform predictions or sequence prediction based on the classification of the time series data into the time windows. In addition, the computing system, in other embodiments, can also perform the predictions based on parsing machine data from other onboard systems that can include environmental settings from the cabin management system and flight information from the flight management system. As such, the computing system, using AI/ML algorithms, can perform sequence predictions to predict when the occupants in the cabin area 130 will perform certain activities, and thereby when they may require help and assistance. The computing system can identify the requirements of the occupants. The requirements can include when the occupants need assistance. The computing system can identify when the occupants require the assistance based on the based on the predictions performed due to the classification of the sequence of data into the time windows. The computing system can also identify communication patterns between occupants when they request for assistance. The computing system can also identify time intervals in which the occupants require privacy based on the predictions performed due to the classification of the sequence of data into the time windows. In addition, the computing system can also identify the time intervals in which the occupants may require assistance or privacy by parsing the cabin management system for settings/states of the environmental controls within the cabin area.

In FIG. 1A, the computing system, using the AI algorithms, can thereby predict the comfort and assistance requirements of the occupants in future time intervals. The computing system can then provide recommendations to the service members to optimize their workload and meet the requirements of the occupants. The computing system can then update the workload of service members in the cabin area. The computing system can provide the updates to optimize the workload of the service members. The service members can be aware of when the occupants will require assistance, and when they can have time to perform tasks within their workload.

Figure 1B:
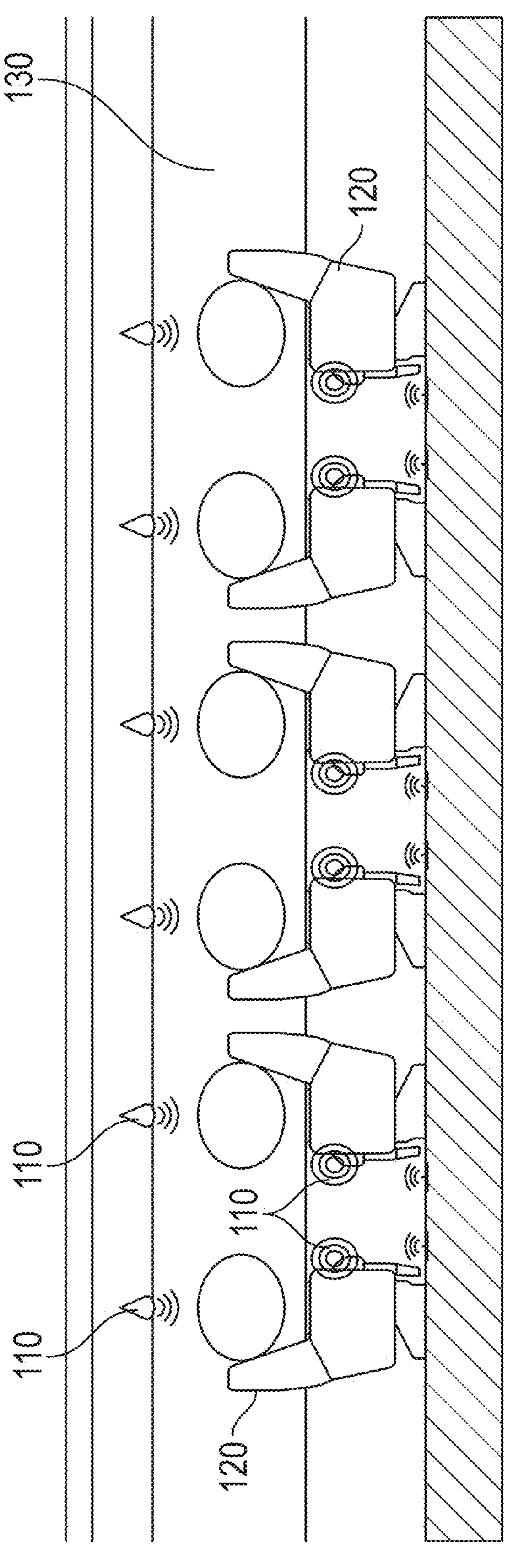
FIG. 1B is a side view illustrating the plurality of sensors positioned on and around the seats of the cabin area in accordance with the teachings of the present disclosure.

With continuing reference to FIG. 1A, FIG. 1B is a side view illustrating the system 100. The system 100 can include the sensors 110 positioned above, around, and on the seats 120 within the cabin area 130. As in FIG. 1A, the sensors 110 can sense the motion and audio of the occupants during a time period. The motion and audio can include when the occupants perform activities and when the occupants request for assistance. The sensors 110 can sense the comfort levels of the occupants and when the occupants may need help and assistance. The sensors 110 can transmit the sensed data to the computing system. The computing system can process the data in a time series or in a sequence as the actions represented by the data occurred. The computing system can then classify the time series data into time windows, wherein the continuous stream of data received can be segmented into different time windows. The computing system can then apply the AI algorithms to perform sequence predictions of the occupants' activities based on the classification of the time series data into the time windows.

In FIG. 1B, from the sequence predictions, the computing system can identify the comfort requirements and assistance requirements of the occupants in upcoming intervals. In particular, the computing device can identify intervals in which the occupants in the cabin area may require medical assistance based on the performed predictions. As a result, the computing system can provide prompts and recommendations to optimize the workloads of the service members in the cabin area 130. The updates to the workloads can enable the service members to optimize their workloads as they can become more aware of when the occupants may need assistance for food or medical emergencies. The service members can also become aware of when the occupants may want the cabin settings such as the lights and temperature in the cabin area 130 to be adjusted according to their preferred comfort levels. The lights can also include various temperatures, brightness levels, and shades of light within the cabin area, and the light or shade around displays within the cabin area. The occupants may also want other cabin settings such as the volume on an intercom or speaker system in which the occupants request for assistance to be adjusted as well. As such, the service members can become more aware of when to perform their workload, and when to assist the occupants.

Figure 2:
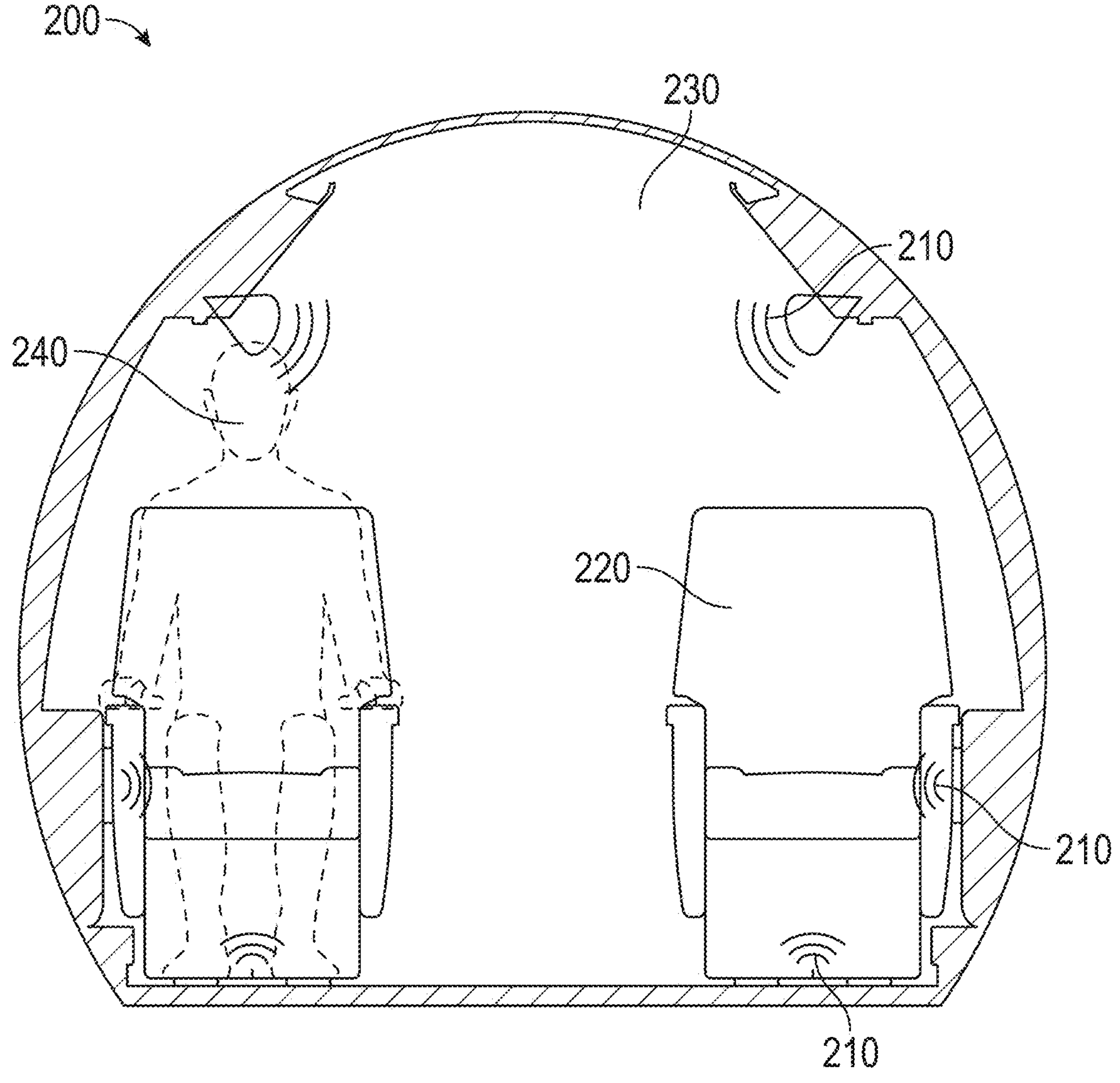
FIG. 2 is a view illustrating a non-limiting embodiment of a plurality of sensors positioned on and around seats in a cabin area, with an occupant positioned in one of the seats in accordance with the teachings of the present disclosure.

With continuing reference to FIGS. 1A and 1B, in FIG. 2, a front-view of a system 200 is illustrated. The system 200 can include sensors 210 positioned above, on, and around a seat 220 within a cabin area 230. The sensors 210 can be placed inconspicuously above, on, and around the seat 220 to where an occupant 240 can be unaware of their presence. The occupant 240 can be positioned within the seat 220. The purpose of the system 200 can be to identify time intervals when the occupant 240 may require assistance to optimize the workload of service members and optimize the efficiency in which the occupant 240 can receive the assistance. By identifying the time intervals, the system 200 can then optimize the workload of service members within the cabin area 230. The system 200 can provide prompts, updates, and recommendations to the service members that can alert the service members when the occupant 240 may require assistance. The occupant 240 may require assistance for food, to have the seat 220 adjusted, or to have the cabin settings in the cabin area 230 adjusted to the occupant's 240 preference. As such, the service members can be aware of when to assist the occupant 240, and when they can attend to their respective workload.

Referring again to FIG. 2, during a time period within the cabin area 230, the occupant 240 can be positioned in various positions within the seat 220. The sensors 210 can sense the motion and audio of the occupant 240 during the time period. The motion and audio can include the time intervals when the occupant 240 is comfortable, and also time intervals when the occupant 240 may need assistance. The occupant 240 may need assistance, for food, for an adjustment of the seat 220, and for cabin settings such as temperature and light to be adjusted to the occupant's 240 preference. The sensors 210 can transmit this sensed motion and audio data to a computing system communicatively coupled to the sensors 210.

In FIG. 2, the computing system can process the received data from the sensors 210 as a time series data, or data in a sequence in which the actions represented by the data occurred. The computing system can then classify the time series data into time windows. When the computing system classifies the time series data or sequence of data into time windows, the computing system is segmenting the continuous sequence of data into respective time windows. The computing system can segment the activities that the occupant performed into specific time windows. The computing system can segment the activities in which the occupant 240 requested assistance into time windows. Similarly, the computing system can also segment the activities that the occupant performed without assistance into time windows.

Referring to FIG. 2, the computing system can then use the time windows and apply AI to make sequence predictions or predictions as to when the occupant 240 may require assistance. The computing system can also use the predictions to identify the requirements of the occupant 240 in upcoming time intervals. The requirements can include time intervals when the occupant 240 will require medical assistance within the cabin area. The requirements can also include when the occupant 240 may require food and beverage service. Other requirements can include a need to adjust cabin settings such as light and temperature to address the comfort levels of the occupant 240 within the cabin area 230. The requirements can also include intervals in which the occupant 240 may require privacy, such as during a sleeping interval. In addition, the identified requirements can also include addressing mood levels of the occupant 240 in various time intervals. As such, the requirements can also include addressing and increasing a comfort level of the occupant 240 in multiple time intervals during the time period.

In FIG. 2, the computing system can then provide recommendations and prompts to service members within the cabin area 230 to optimize the workload of the service members. The recommendation or recommendations can be continuously provided in multiple time intervals during a time period. Moreover, the recommendations can include a series of prompts at various time intervals to crew members or service members to optimize the workload. In some instances, the recommendation can include a prompt to provide a meal or beverage service to the occupant 240 and another occupant in multiple time intervals. The computing system can alert the service members as to the upcoming intervals in which the occupant 240 may want assistance. The upcoming intervals can include a medical emergency for the occupant 240, or when the occupant 240 wants the temperature and light within the cabin area 230 to be adjusted according to the occupant's 240 preference. The computing system can alert the service members to increase or address the comfort level of the occupant 240 in multiple time intervals. By the sequence prediction and identified requirements, the computing system can provide the recommendations to service members so that the service members can optimize their workload and their service to the occupant 240. The service members can be aware of when they have to assist the occupant 240, and of when they can perform their respective workload.

With continuing reference to FIGS. 1A-2, FIG. 3 illustrates a flow diagram 300 that provides the steps that a computing system described in FIGS. 1A-2 performs when it receives the data from the sensors described in FIGS. 1A-2. The purpose of the flow diagram 300 is to illustrate the steps the computing system performs after receiving the sensed data from the sensors in relation to the behavior of the occupants in the cabin area. The flow diagram 300 illustrates each of the steps involved that the computing system uses to provide recommendations to the service members to optimize their workloads and optimize assistance of the occupants in the cabin area.

Figure 3:
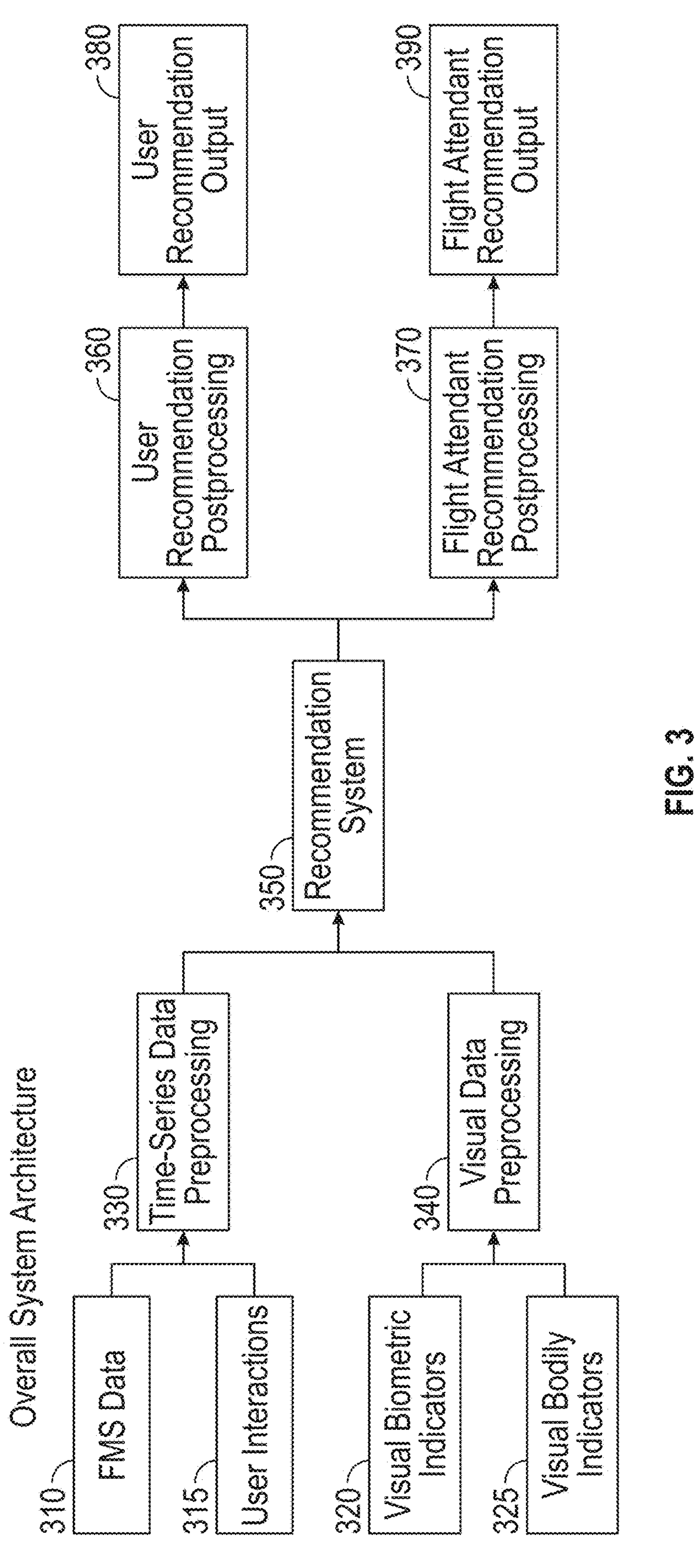
FIG. 3 is a flow diagram illustrating a non-limiting example of the steps that a computing system communicatively coupled to each sensor performs after receiving the data from the sensors in accordance with the teachings of the present disclosure.
Figure 4:
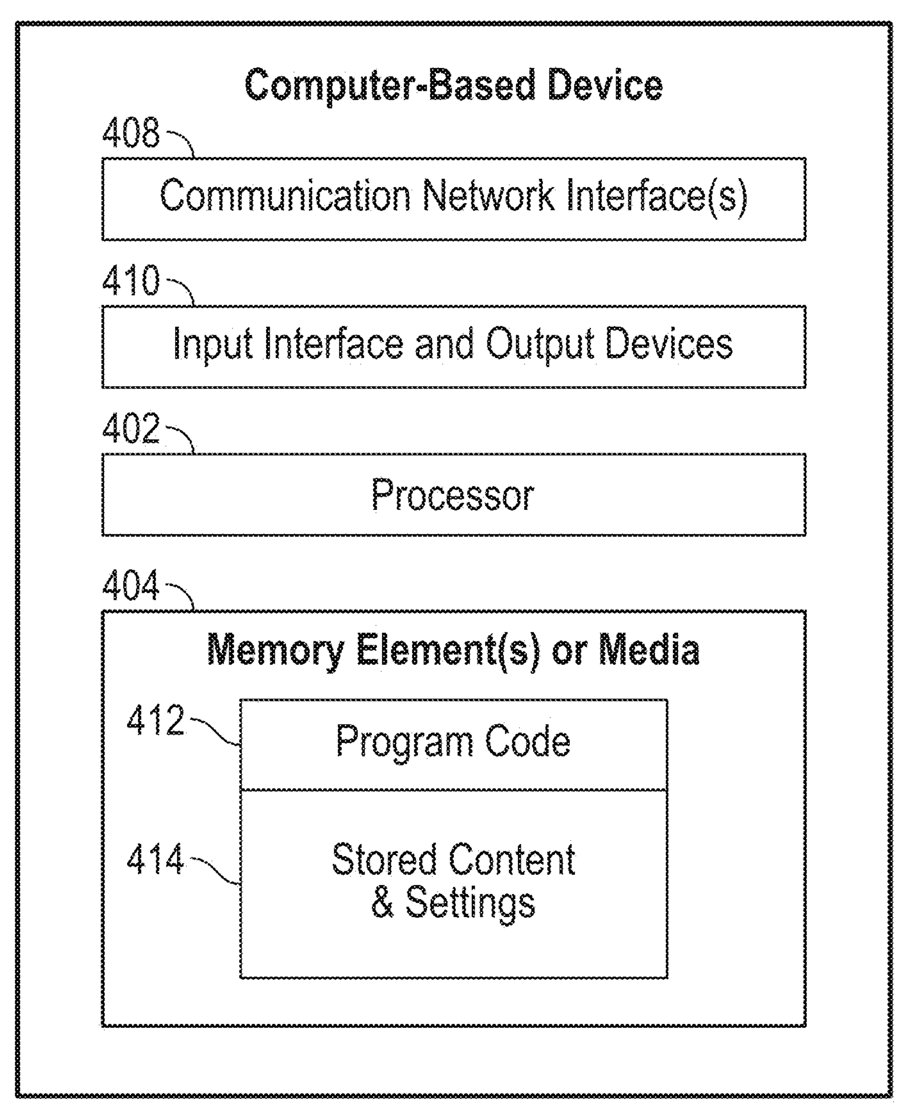
FIG. 4. is a block diagram of a non-limiting embodiment of a computer-based device in accordance with the teachings of the present disclosure.

In FIG. 3, the computing system processes flight management system (FMS) data 310, wherein the FMS data relates to the path of the vehicle itself. The user interactions 320 refers to the audio and dialogue of the occupants within the cabin area. The occupants can interact with each other and with service members when requesting for assistance. The computing system sends the FMS data 310 and user interactions 320 for time series data preprocessing 330. The time series data preprocessing 330 can refer to the computing system performing a statistical analysis collected over time of the FMS data 310 and the user interactions 320. The computing system can apply AI algorithms to identify patterns, trends, and any irregularities from the FMS data 310 and the user interactions 320.

Referring to FIG. 3, the computing system can collect visual biometric indicators 320 and visual body indicators 325 for visual data preprocessing 340. The visual biometric indicators 320 can be the sensed motion and audio in relation to the hands, body, and face of the occupants during a time period. In addition, the visual biometric indicators 320 can be the motion and audio of the hands, body, and face of the occupants in relation to their mood levels, comfort levels, and when the occupants requested assistance. The visual body indicators 325 can refer to the sensed data of the body positions of the occupants during the time period. The visual body indicators 325 can also include the body positions when the occupants requested assistance. The visual data preprocessing 340 can be where the computing system identifies patterns and trends from the visual biometric indicators 320 and the visual body indicators 325. The computing system can identify patterns and trends from the finger movements, body movements, and body positions to further identify the comfort and assistance requirements of the occupants in the cabin area.

In FIG. 3, the computing system can pass the analyzed data from the time series data preprocessing 330 and visual data preprocessing 340 to a recommendation system 350. The recommendation system 350 can provide an output for an occupant and for a service member (flight attendant, as an example) in the cabin area. The recommendation system 350 can provide user recommendation postprocessing 360. The user recommendation postprocessing 360 can include tailored recommendations to be provided on behalf of the occupants. The computing system can process and determine the recommendations to be provided for the occupants based on the analysis of the data received from the sensors. The computing system can determine the recommendations to address the requirements and needs of the occupants in the cabin area. With the user recommendation output 380, the recommendations can be output to the service members to address the requirements and needs of the occupants within the cabin area.

In FIG. 3, the recommendation system 350 can also provide flight attendant recommendation postprocessing 370. With the flight attendant recommendation postprocessing 370, the computing system can determine the recommendations to provide the flight members or service members within the cabin area. The recommendations can be determined to enable the service members to optimize their respective workloads. With the flight attendant recommendation output 390, the computing system can output the recommendations for the service members. The service members can be notified of the recommendations to optimize their respective workloads. More specifically, the service members can know when to assist the occupants with their needs and requirements and when to perform their tasks within their respective workloads.

With continuing reference to FIGS. 1A-FIG. 3, FIG. 4 is a simplified block representation of an exemplary embodiment of a computer-based device 400, which may be used to implement certain devices or systems onboard the aircraft in which the cabin area can be located. The computer-based device 400 can be communicatively coupled to the sensors described in FIGS. 1A-2. In addition, the computer-based device 400 can perform the steps of the flow diagram 300 illustrated in FIG. 3. The purpose of the computer-based device 400 can be to receive the data from the sensors to provide recommendations to service members in the cabin area to optimize their workload. The service members can optimize their workload due to the recommendations by knowing the time intervals when the occupants can require assistance within the cabin area. The device 400 generally includes, without limitation: a processor 402; a memory storage device, storage media, or memory element/media 404; a communication network interface 408; and input interface and output (I/O) devices 410, such as an input interface, output devices, human/machine interface elements, or the like. In practice, the device 400 can include additional components, elements, and functionality that may be conventional in nature or unrelated to the particular application and methodologies described here.

The processor 402 may be, for example, a central processing unit (CPU), a graphical processing unit (GPU), a field programmable gate array (FPGA), a microcontroller, an application specific integrated circuit (ASIC), or any other logic device or combination thereof. Memory elements 404 are communicatively coupled to the processor 402 and can be implemented with any combination of volatile and non-volatile memory. The memory element/media 404 have non-transitory processor-readable and processor-executable program code (instructions) 412 stored thereon, wherein the instructions 412 are configurable to be executed by the processor 402 as needed. When executed by the processor 402, the instructions 412 cause the processor 402 to perform the associated tasks, processes, and operations defined by the instructions 412. Of course, the memory element/media 404 may also include instructions associated with a file system of the host device 400 and instructions associated with other applications or programs. Moreover, the memory element/media 404 can serve as a data storage unit for the host device 400. For example, the memory element/media 404 can provide stored content and settings 414 for aircraft data, navigation data, sensor data, measurements, image and/or video content, settings or configuration data for the aircraft, and the like.

The communication network interface 408 represents the hardware, software, and processing logic that enables the device 400 to support data communication with other devices. In practice, the communication network interface 408 can be suitably configured to support wireless and/or wired data communication protocols as appropriate to the particular embodiment. For example, the communication network interface 408 can be designed to support a cellular communication protocol, a short-range wireless protocol (such as the BLUETOOTH communication protocol), and/or a WLAN protocol. As another example, if the device 400 is a computer, then the communication interface can be designed to support the BLUETOOTH communication protocol, a WLAN protocol, and a LAN communication protocol (e.g., Ethernet). In accordance with certain aircraft applications, the communication interface 408 is designed and configured to support one or more onboard network protocols used for the communication of information between devices, components, and subsystems of the aircraft.

The I/O devices 410 enable a user of the device 400 to interact with the device 400 as needed. In practice, the I/O devices 410 may include, without limitation: an input interface to receive data for handling by the device 400; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device.

With continuing reference to FIGS. 1A-FIG. 4, FIG. 5 illustrates a flow diagram 500 that illustrates the process in which a computing device provides a recommendation to a service member in a cabin area of a vehicle to optimize a workload of the service member. The purpose of the flowchart 500 is to provide the process in which the computing system receives data from a sensor in relation to a behavior of an occupant and provides a recommendation to a service member in a cabin area. The computing system can provide the recommendation to optimize the workload of the service member with the knowledge of the requirement of the occupant and the predicted sequences in which the occupant may require assistance. The assistance can be with respect to, but not limited to, increasing or addressing the comfort levels of the occupant with respect to the cabin settings (temperature, lights), providing food at specific intervals, or assisting the with a medical emergency.

At step 510, a computing system communicatively coupled to sensors can receive data relating to a behavior of an occupant in the cabin area of the vehicle. The sensors can be positioned above, on, and around the seat of the occupant. The sensors can be positioned inconspicuously so that the occupant is unaware of their presence. During multiple time intervals during a time period, the sensors can sense the motion and audio of the occupant, and thereby sense when the occupant may request assistance during the time period. The sensors can then transmit the sensed data to the computing system.

Then, at step 520, the computing system can process the data in a sequence. The computing system can process the received data in a time series, wherein the computing system can process the data according to the sequence in the actions represented by the data occurred.

At step 530, the computing system can classify the sequence of data into time windows. With the time windows, the computing system can segment the continuous stream of data into segmented windows. The computing system can apply machine learning algorithms to classify the sequence of data into the time windows. Some of the time windows can indicate when the occupant requested assistance, while other time windows can indicate intervals when the occupant did not require or request assistance.

At step 540, the computing system can perform predictions based on the classification of the sequence of data into the time windows. The computing system can perform sequence prediction based on the time windows. Further, the computing system, in other embodiments, can also perform the predictions based on parsing machine data from other onboard systems that can include environmental settings from the cabin management system and flight information from the flight management system. The computing system can predict when the occupant may require assistance in upcoming intervals and when service members may be needed to assist the occupant.

Then, at step 550, the computing system can identify a requirement of the occupant based on the predictions. The computing system can identify a requirement such as a medical situation involving the occupant, or the occupant's preferences with regards to cabin settings such as with the light and temperature in the cabin area. The computing system can thereby identify a requirement that the occupant may require assistance within an upcoming time interval.

Figure 5:
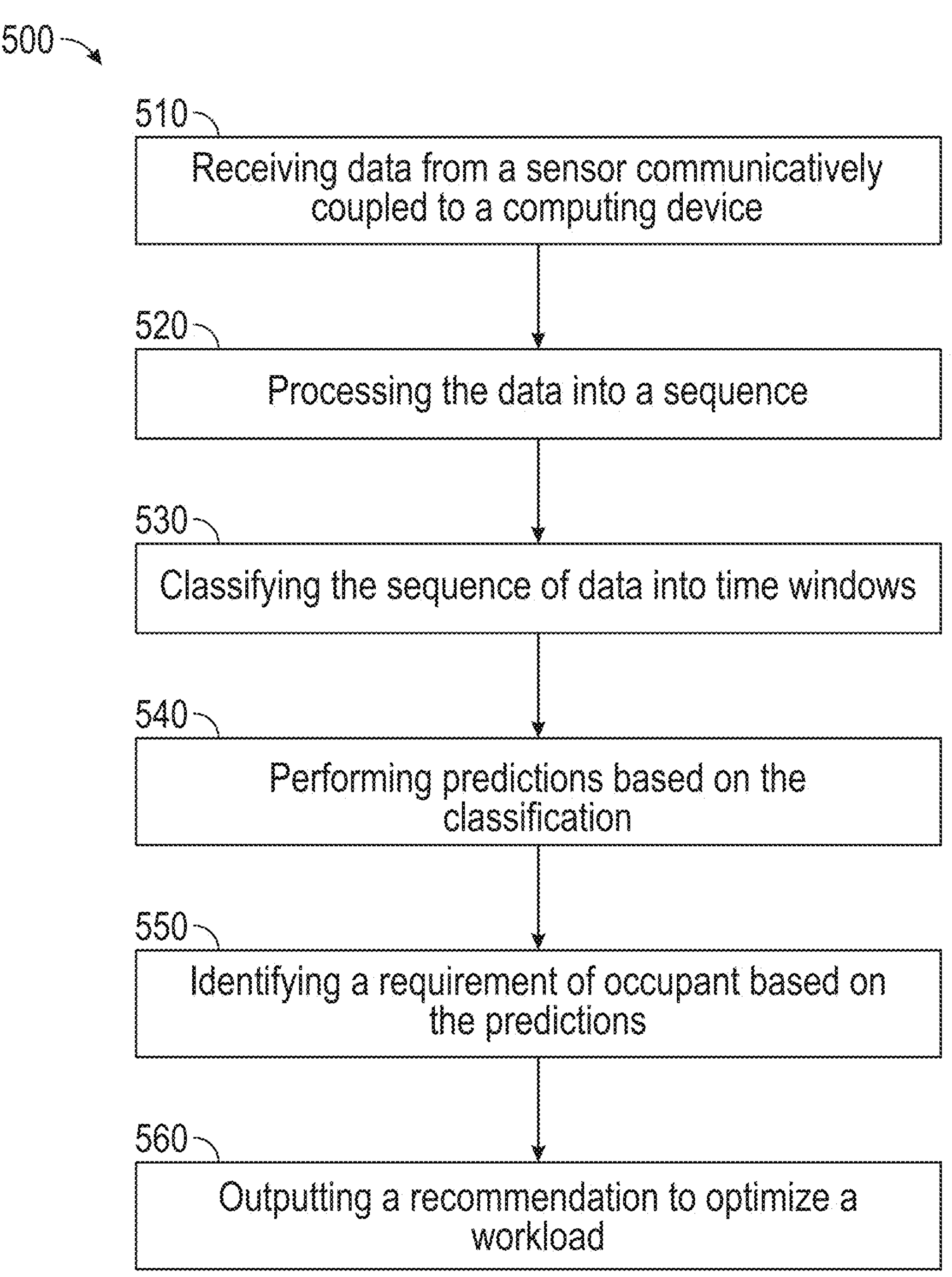
FIG. 5 is flow diagram that illustrates a non-limiting embodiment of the teachings of the present disclosure.

With continuing reference to FIG. 5, at step 560, the computing system outputs a recommendation to optimize a workload and meet the requirement of the occupant. The computing system can provide the recommendation in multiple time intervals to optimize the workload of a crew member or service member in the area. The computing system can provide the recommendation to service members within the cabin area. Based on the recommendation, the computing system can update a schedule, electronic checklist, or a flight plan in the cabin area to optimize the workload of a crew member assisting the occupant in the cabin area. When the computing system performs the update, the computing system can also identify the key phases of the flight that can include, but are not limited to, both the top of the climb and top of the descent of the flight itself. In addition, the computing system can alert the service member to update an environmental setting in the area to meet the requirement of the occupant. The recommendation can alert the service members as to what the occupant requires, and when the occupant may require assistance. As a result, the workload of the service members can be optimized because the service members can be aware of when the occupant needs assistance. The service members thereby can be more likely to know when to perform their workload and when to assist the occupant.

As illustrated in FIGS. 1A-5, sensors can sense motion and audio of occupants in a cabin area. The sensors can sense the motion and audio that includes the body, head, and finger movements of the occupants when the occupants request for assistance and when the occupants perform normal activities without assistance. The sensors can transmit the data on the occupants to a computing system that is communicatively coupled to the sensors.

The computing system can then perform analysis on the data. The computing system can process the data in a time series or sequence. The computing system can then classify the sequence of data into time windows, wherein the continuous stream of data is segmented into respective time windows. From the time windows, the computing system can perform sequence predictions. The computing system can predict upcoming sequences in which occupants may require assistance within the cabin area. From the sequence predictions, the computing system can identify the requirements of the occupants. The requirements can include when the occupants may want to eat or sleep. Other requirements can include medical emergencies that need to be addressed.

After identifying the requirements of the occupants, the computing system can provide recommendations. The computing system can provide the recommendations to optimize the workload of the service members and meet the requirements of the occupants. The service members can have their workload optimized because they can be aware of time intervals in which the occupants may require assistance. As such, the service members can be aware of when they can perform their tasks to perform their workload and when they are needed to assist the occupants. As a result, the efficiency of service to the occupants can be optimized. In addition, the efficiency in which the service members perform their workload can be optimized as well.

While an exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A method for optimizing assistance, the method comprising:

receiving from a sensor communicatively coupled to a computing device, data relating to a behavior of an occupant positioned in an area;

processing the data into a sequence with the computing device;

classifying, the sequence of data into time windows with the computing device;

performing predictions with the computing device based on the classification of the sequence of data into the time windows;

identifying, with the computing device, a requirement of the occupant in the area based on the predictions; and outputting, with the computing device, a recommendation to optimize a workload to meet the requirement of the occupant in the area.

2. The method of claim 1, further comprising:

applying, with the computing device, machine learning algorithms to classify the sequence of data into the time windows.

3. The method of claim 1, further comprising:

updating, with the computing device, a schedule, electronic checklist or a flight plan in the area to optimize the workload of a crew member assisting the occupant in the area.

4. The method of claim 1, further comprising:

updating, with the computing device, an environmental setting in the area to meet the requirement of the occupant.

5. The method of claim 1, further comprising:

providing, by the computing device, the recommendation in multiple time intervals to optimize the workload of a crew member in the area.

6. The method of claim 1, further comprising:

identifying, with the computing device, time intervals in which the occupant requires privacy based on the predictions performed due to the classification of the sequence of data into the time windows and settings and states of environmental controls parsed from a cabin management system.

7. The method of claim 1, further comprising:

identifying, with the computing device, when the occupant requires the assistance based on the predictions performed due to the classification of the sequence of data into the time windows.

8. The method of claim 1, further comprising:

identifying, with the computing device, time intervals in which cabin settings in the area have to be adjusted based on the predictions that are performed.

9. The method of claim 1, further comprising:

identifying, with the computing device, intervals in which another occupant in the area will require medical assistance based on the performed predictions.

10. A non-transitory machine-readable storage medium that provides instructions that, when executed by a processor, are configurable to cause the processor to perform an operation comprising:

receiving from a sensor communicatively coupled to the processor, data relating to a behavior of an occupant positioned in an area;

processing the data into a sequence;

classifying, the sequence of data into time windows;

performing predictions based on the classification of the sequence of data into the time windows;

identifying a requirement of the occupant in the area based on the predictions; and outputting a recommendation to optimize a workload to meet the requirement of the occupant in the area.

11. The non-transitory machine-readable storage medium of claim 10, wherein the recommendation provides a series of prompts at various time intervals to crew members to optimize the workload.

12. The non-transitory machine-readable storage medium of claim 10, wherein the instructions are configurable to cause the processor to:

identify a sleeping interval of the occupant based on the predictions that are performed.

13. The non-transitory machine-readable storage medium of claim 10, wherein the instructions are configurable to cause the processor to:

identify when light, shades, or volume on a speaker in the area need to be adjusted to meet the requirement of the occupant.

14. The non-transitory machine-readable storage medium of claim 10, wherein the instructions are configurable to cause the processor to:

detect mood levels of the occupant based on the predictions that are performed.

15. The non-transitory machine-readable storage medium of claim 10, wherein the instructions are configurable to cause the processor to:

identify a potential communication pattern of the occupant with another occupant in the area based on the predictions that are performed.

16. A computing system comprising:

a non-transitory machine-readable storage medium that stores software; and a processor, coupled to the non-transitory machine-readable storage medium, the processor configured to execute the software that implements a large language model (LLM) grounding service and that is configured to perform operations comprising:

receiving from a sensor communicatively coupled to the processor, data relating to a behavior of an occupant positioned in an area;

processing the data into a sequence;

classifying, the sequence of data into time windows;

performing predictions based on the classification of the sequence of data into the time windows;

identifying a requirement of the occupant in the area based on the predictions; and outputting a recommendation to optimize a workload to meet the requirement of the occupant in the area.

17. The computing system of claim 16, wherein the recommendation includes a prompt to provide a meal or beverage service to the occupant and to another occupant in multiple time intervals.

18. The computing system of claim 16, wherein the requirement includes increasing or addressing a comfort level of the occupant in multiple time intervals.

19. The computing system of claim 16, wherein the predictions include a prediction based on a time interval when the occupant will require medical assistance.

20. The computing system of claim 16, wherein the recommendation will be continuously provided in multiple time intervals during a time period.

* * * * *